United States Patent
Bell et al.

(10) Patent No.: US 9,888,122 B2
(45) Date of Patent: Feb. 6, 2018

(54) SYSTEM AND METHOD FOR DYNAMIC CALL DIVERSION

(71) Applicant: Genesys Telecommunications Laboratories, Inc., Daly City, CA (US)

(72) Inventors: Cliff Bell, Kalispell, MT (US); Daniel Stoops, Powell, OH (US); Sergey Fedorov, Moraga, CA (US); Herbert Willi Artur Ristock, Walnut Creek, CA (US); David Beilis, Maples (CA); Adrian Lee-Kwen, Markham (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/812,607

(22) Filed: Jul. 29, 2015

(65) Prior Publication Data

US 2017/0034353 A1  Feb. 2, 2017

(51) Int. Cl.
| H04M 3/00 | (2006.01) |
| H04M 3/523 | (2006.01) |
| H04L 29/06 | (2006.01) |
| H04M 3/51 | (2006.01) |
| H04W 4/14 | (2009.01) |
| H04W 12/06 | (2009.01) |

(52) U.S. Cl.
CPC ...... *H04M 3/5235* (2013.01); *H04L 63/0853* (2013.01); *H04M 3/5166* (2013.01); *H04W 4/14* (2013.01); *H04W 12/06* (2013.01)

(58) Field of Classification Search
CPC ............. H04M 3/5235; H04M 3/5233; H04M 3/5183; H04M 3/5166; H04M 3/5232; H04M 3/5175; H04M 3/523; H04M 3/54
USPC .............. 379/265.01–265.02, 265.13, 211.02
See application file for complete search history.

(56) References Cited

U.S. PATENT DOCUMENTS

| 7,822,188 | B1 * | 10/2010 | Kirchhoff ............. | H04M 3/436 379/211.02 |
| 8,599,836 | B2 | 12/2013 | Van Buren et al. | |
| 2005/0097008 | A1 | 5/2005 | Ehring et al. | |
| 2008/0132218 | A1 | 6/2008 | Samson et al. | |

(Continued)

FOREIGN PATENT DOCUMENTS

KR  100983240 B1  9/2010

OTHER PUBLICATIONS

International Search Report and Written Opinion for Application No. PCT/US2016/044596, dated Nov. 8, 2016, 14 pages.

*Primary Examiner* — Rasha Al Aubaidi
(74) *Attorney, Agent, or Firm* — Lewis Roca Rothgerber Christie LLP (57) ABSTRACT

A system includes a contact center to provide an interaction between a customer and an agent workstation of the contact center. A contact center network connects a call from a mobile device to an interactive voice response application. A mobile engagement platform collect authentication information from the mobile device to authenticate a customer using the mobile device. A short message service platform sends a link to connect the mobile device to a mobile application. The mobile engagement server authenticates the customer of the mobile device for the mobile application based on the collected authentication information.

14 Claims, 5 Drawing Sheets

(56) References Cited

U.S. PATENT DOCUMENTS

| | | | |
|---|---|---|---|
| 2009/0209239 A1* | 8/2009 | Montesdeoca | H04M 3/493 455/414.2 |
| 2011/0054905 A1 | 3/2011 | Lagadec et al. | |
| 2016/0048846 A1* | 2/2016 | Douglas | G06Q 30/0185 705/318 |
| 2016/0192108 A1* | 6/2016 | Chaudhary | H04W 4/003 455/411 |

\* cited by examiner

SYSTEM AND METHOD FOR DYNAMIC CALL DIVERSION

BACKGROUND

Contact centers exist to handle sales, service and technical support for businesses offering products and or services to their customers and potential customers. Customers and potential customers can call the contact center, send a text, use a mobile application, visit a website of the contact center, etc.

BRIEF DESCRIPTION OF THE DRAWINGS

In association with the following detailed description, reference is made to the accompanying drawings, where like numerals in different figures can refer to the same element.

DETAILED DESCRIPTION

Systems and methods for a contact center can provide a low cost web channel to customers that initially call the contact center. The web channel can also provide an increased customer experience over the call. In some implementations a customizable dialer may be used for the calls and web channel. Additionally or alternatively, audio commands can be used to navigate the call and/or web channel.

Figure 1:
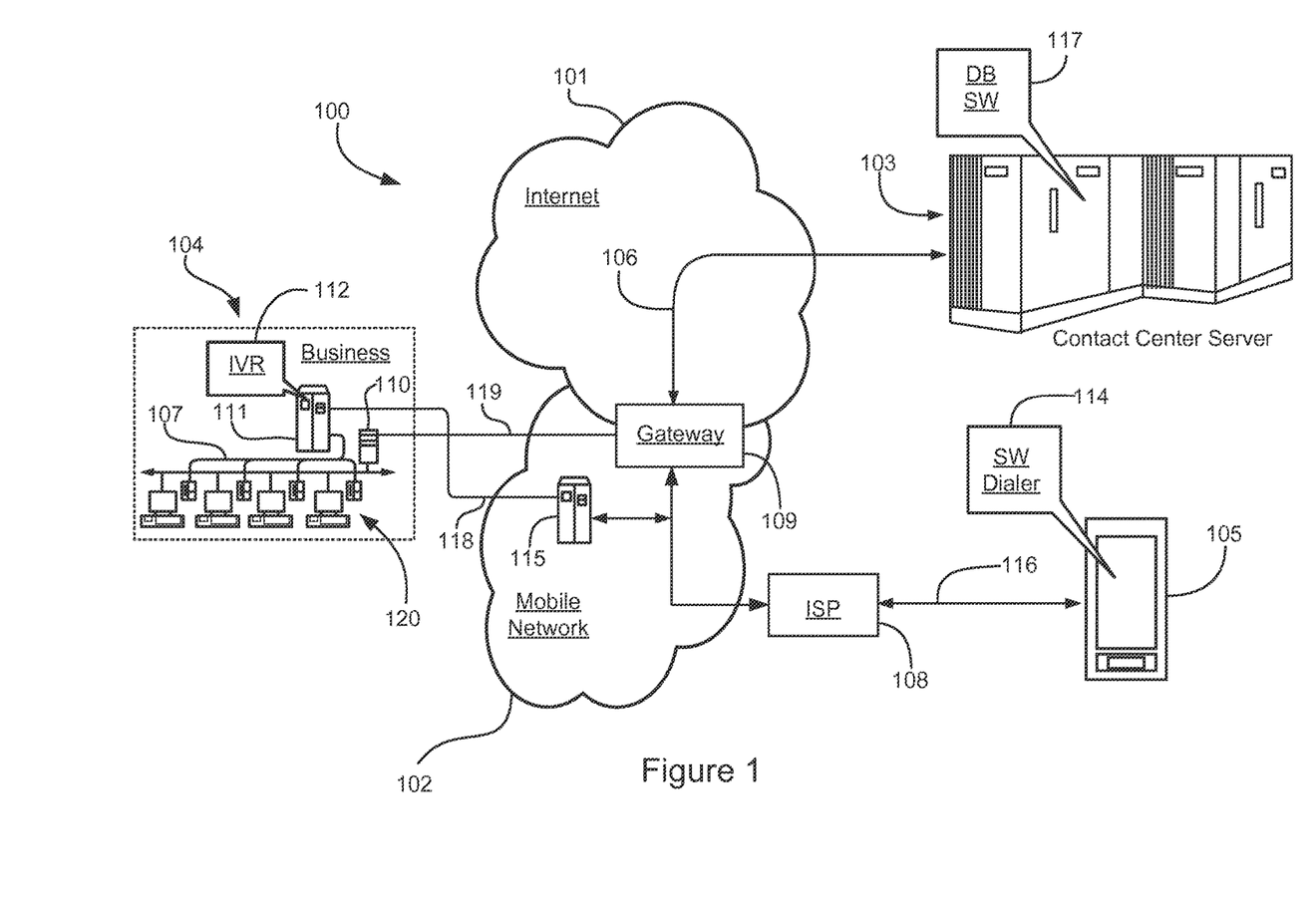
FIG. 1 is an architectural overview of a communications network supporting consumer-to-business communication.

FIG. 1 is an architectural overview of a communications network 100 supporting consumer-to-business communication. Communications network 100 includes an Internet network 101 and a mobile network 102, e.g., of a telephony carrier. Mobile network 102 may be any wireless carrier network, e.g., having access to Internet network 101. Mobile network 102 may be a cellular telephony network, a wireless fidelity (WiFi) network or any other network capable of carrying voice communications for mobile clients. It should be noted that although network 102 is illustrated as a wireless network, in some embodiments the network 102 may be a wired telephone network.

Internet network 101 includes the lines, equipment, and access points that make up the Internet network as a whole including connected sub-networks. Therefore, there is no geographic limitation. In one embodiment, network 101 may be a wireless network segment such as a municipal area network (MAN), or a corporate wide area network (WAN), etc. Mobile carrier network 102 serves clients who operate a variety of mobile communications devices. One such potential consumer is represented herein by a mobile device 105. Mobile device 105 may include a smart phone, a tablet, a personal digital assistant (PDA), or a computing appliance running a telephony application.

In this example, communications network 100 connects potential consumers to voice services offered by a business 104. Business 104 may be any type of business offering products and or services to a consumer base. In an embodiment, business 104 is a business with multiple regional locations, perhaps including multiple national and international locations. Business 104 represents just one of potential locations and includes a service center comprising multiple communications stations. Communications station includes a local area network (LAN) connected computer and a telephone for voice communication. Additionally or alternatively, there may be remote home agents and mobile agents. In an embodiment, both telephones and computing stations are adapted for voice communications. Mobile device 105 has wireless connection to network 102 via a wireless link 116. In this example, consumer operating mobile device 105 is connected to an Internet service provider (ISP) 108 enabling access to Internet network 101 through a multimedia gateway 109. Mobile device 105 is also capable of receiving and making telephone voice calls through traditional networks such as the public switched telephone network and via Voice over Internet protocol (VoIP).

Business 104 includes a telephony switch 111 connected by a telephone trunk 118 to a local telephone switch 115 within mobile network 102. Switches 111 and 112 may be private branch exchange (PBX) switches or automated call distributors (ACD) switches capable of distributing telephone calls. The telecommunication network may also include service control points (SCP) that connects with the switches 111 and 112. The telephones at communications stations 120 have connection to switch 111 in this example, via internal telephone wiring 107. Switch 111 has access to an interactive voice response (IVR) application adapted to screen incoming calls and to provide routing and automated services to potential consumers. The LAN inside business 104 supports an Internet protocol router 110 adapted to receive and route VoIP requests to agents manning communications stations 120. In this sense, business 104 can handle multiple channels of communication including plain old telephony system (POTS) calls and Internet protocol network telephony (IPNT). The contact services performed by business 104 may instead be contracted out to a third party such as a contact center.

A third-party contact center server 103 is illustrated in this example and is adapted to be a service provider of the service. The contact service infrastructure illustrated in business 104 may be hosted by a contact center that also hosts server 103. Server 103 includes a non-transitory physical medium containing the data and instructions required to enable function as a data server connected to the Internet. Server 103 has connection to Internet 101 via an Internet access line 106, and to mobile network 102 through gateway 109. Server 103 includes a database application that is adapted to receive, maintain, and serve data belonging to businesses that may subscribe to a third-party-hosted service. In another embodiment, a business may acquire the capability of implementing the service internally for its sole use.

In this embodiment, business 104 publishes specific voice contact data for all of its locations to contact center server 103. Such information is maintained for the business with the aid of instructions 117. Business 104 may have multiple local telephone numbers for each office or business department distributed over a region, the local numbers for use by potential consumers who are within local calling distance from a particular office or department. In addition, business 104 may also have special 1-800 toll-free telephone numbers for consumers who must reach a specific office or department, but that are currently outside of the local calling distance of that office or department. Contact center server 103 maintains all of a businesses' published (local) contact numbers as well as published 1-800 numbers. Server 103 may also maintain published VoIP telephone numbers and Skype numbers, or other unified communications (UC) services, used by the business.

Mobile device 105 has a dialer 114 residing on a non-transitory physical medium and executed to run in this example. Dialer 114 serves as a proxy-dialing engine for mobile device 105. Dialer 114 includes logic for establishing a channel to a URL-based Web service running on contact center server 103. Dialer 114 may be downloaded from server 103 or from any website or mobile application operated by the entity providing the service. In another embodiment, dialer 114 may be a temporary download instead of a resident application.

Figure 2:
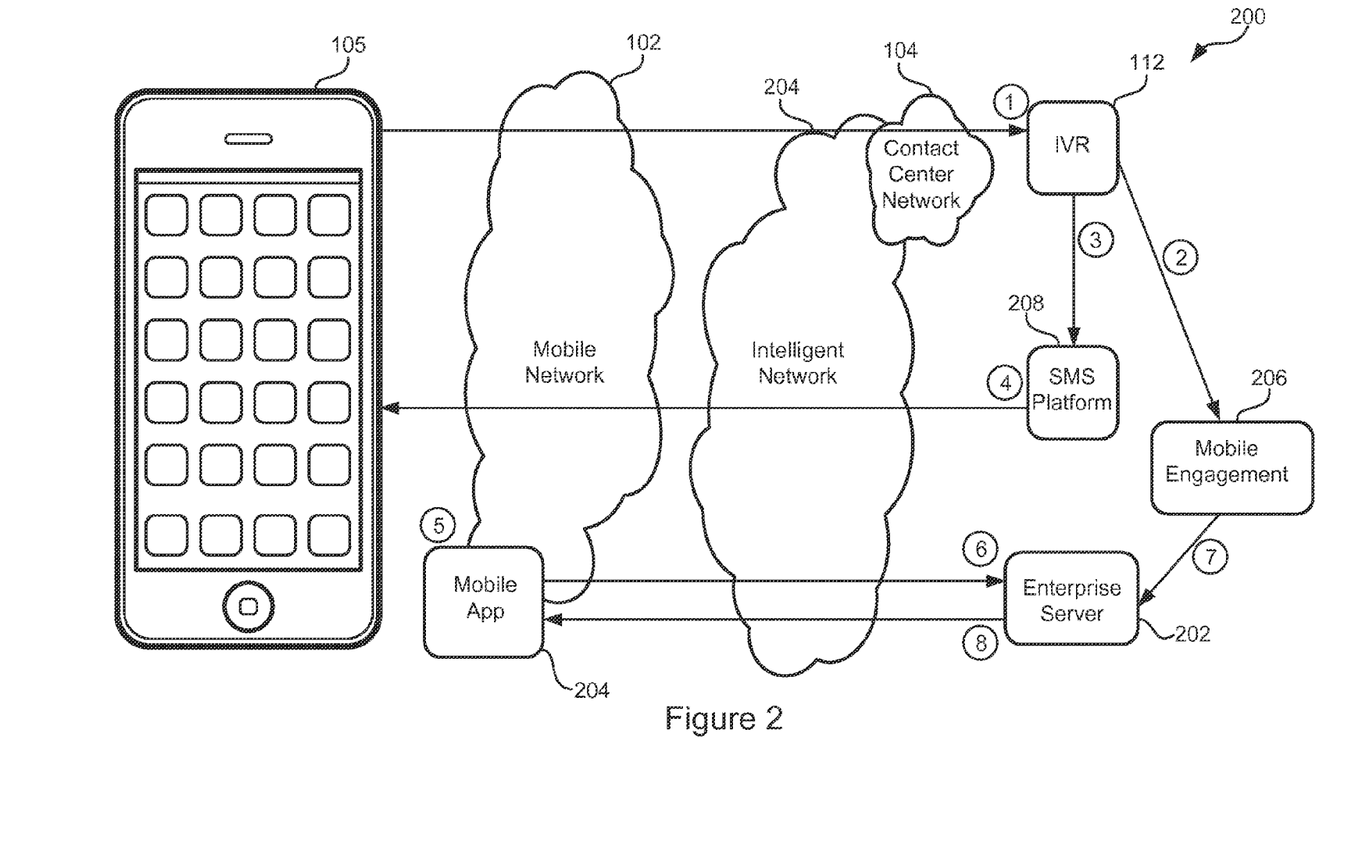
FIG. 2 is a block diagram of an example architecture for performing dynamic diversion of a caller to a mobile application.

FIG. 2 is a block diagram of an example architecture 200 for performing dynamic diversion of a caller to a mobile application of the business 104. The mobile application can be provided by enterprise server 202. When the mobile device 105 makes a call the mobile network 102 routes the call to the intelligent network 204 which determines that the call is routed to the contact center network 104, e.g., based on an automatic number identification (ANI) and/or dialed number identification service (DNIS) associated with the call. The contact center network 104 can the IVR 112 to collect information about the call, e.g. by the caller answering questions using the touchpad of the mobile device 105. The IVR 112 passes the collected information to a mobile engagement platform 206 which can store the collected call information for the caller.

The IVR 112 sends the call information to a short message service (SMS) platform 208 which can create a web link in response to the call and send an SMS message containing the web link for the enterprise to the mobile device 105 along with an authentication token containing the call information. Other types of messaging servers can be used, e.g., ANDRIOD based messaging services, APPLE based messaging services, multimedia messaging service (MMS), etc. By clicking the web link when the SMS message is received, the mobile device 105 can connect through a mobile application of the mobile device 105 to the enterprise server 202 which can contain web-based information about the business 104, the caller, etc. In other implementations the mobile device 105 can connect via a website, etc. The website and/or the mobile application can include a customized page based on the information collected by the IVR 112 and passed to the enterprise server 202 by the mobile engagement platform 206. The mobile engagement platform 206 can use a representation state transfer (REST) or other protocol to transfer the information to the enterprise server 202 and mobile device 105. The mobile application of the mobile device 105 can also be customized to provide outcomes targeted by the business 104. Therefore, the architecture 200 can seamlessly move the caller from their call experience to a mobile application 204 to display a customized website for the caller. The mobile application 204 can be loaded on to the mobile device 105 or stored remotely from the mobile device 105.

By moving the interaction from a call to a customized website the architecture 200 can provide a lower cost channel to the callers who call the contact center. In addition, the architecture 200 can provide to a rich customer interaction experience with a precise and intelligent transition between the initial phone call and the target menu/application page in the mobile experience. Thus, the architecture 200 need not drive a caller to either complete their experience through the IVR 112/agent voice channel, or start their experience and/or authentication from scratch within the mobile application. In the first case, a business benefit of reducing voice traffic/cost may not be realized. In the second case, the caller may be asked to work hard at being the broker of information between the IVR 112 and the mobile application experience, with disconnected communication channels and poor/frustrating caller experience.

From the IVR 112, the architecture 200 can send the caller a session-specific, targeted page SMS link that maintains the context of any progress that the caller has already made in the IVR 112, and delivers the caller to a specific page in the mobile application based on context gathered in the IVR 112, and/or additional conditions, e.g., a caller value segment, etc., evaluated to drive the target mobile application page for the transition. The architecture can decrease the number of minutes that callers spend on phone calls listening to an IVR 112, thus reducing the ongoing operational cost for the business, e.g., fewer IVR ports, 800 numbers, lines, etc. In addition, the architecture 200 can improve the caller experience by making the transition to a low-cost, media rich communication method in a seamless way.

Figure 3:
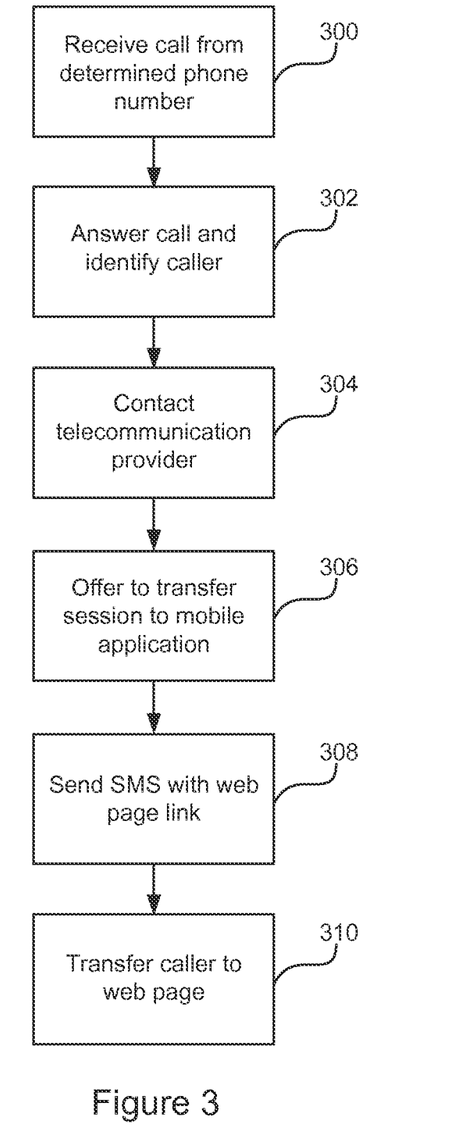
FIG. 3 is a flowchart of an example logic for dynamically diverting a call to a mobile application.

FIG. 3 is a flowchart of an example logic for dynamically diverting a call to a website.

The contact center network 104 receives a call from a determined phone number (300). Contact center phone numbers are mechanisms for callers to resolve problems or purchase products. Sometimes a visual experience, e.g., via a mobile application, can be a better experience for the caller and a less expensive solution for the contact center network 104. In addition, the mobile application may allow for different types of transactions than can be accomplished by the IVR 112. The IVR 112 can notify the caller that additional features are available via the mobile application.

The phone call can be placed from a mobile phone, a tablet, a computer, a landline phone, etc. to the contact center network 104. The IVR 112 answers the call and identifies the caller through an automatic number identification (ANI), an account number, etc. (302). The IVR 112 can also contact the telecommunication provider network API, e.g., AT&T, to determine if the caller is calling from an AT&T mobile device 105 (304). Additionally or alternatively the IVR 112 can play a prompt asking if the caller is using the mobile device 105.

During the IVR call flow, if the caller is using the mobile device 105, the IVR 112 offers the caller to transfer the session to the mobile application 204 (306). If the caller accepts, then the architecture 200 sends a dynamically created SMS message to the caller's phone with a link pointing to the mobile application 204 along with a dynamic diversion token appended to the uniform resource locator (url) of the web page (308). The SMS link to a specific page in the mobile application 204 is a clean way to maintain the caller experience moving from IVR 112 to the mobile application 204 without requiring the caller to start over by further collecting authentication information for the mobile application 204. The mobile application 204 retrieves the current context of the caller experience along with the authentication using the dynamic diversion token and then starts the mobile application 204 in the same context where the caller left off in the IVR 112, e.g., the caller is trying to transfer funds. The architecture 200 allows the IVR 112 to transfer the caller to the mobile application 104 without losing authentication or the context of the call (310).

In one example, the business 104 allows callers to contact it across many channels, e.g., website, mobile application 204, IVR 112, contact center agent, TWITTER, etc. The architecture 200 enables a caller to switch channels from the IVR 112 to the mobile application 204, and enables the mobile application 204 to pick up where the caller left on the IVR channel, the agent, the website, the TWITTER communication, etc. In a flight booking example, when the caller is on the IVR channel they may not be able to make a seat selection due to the limitations of the voice channel. If the caller is calling from the mobile device 105, then the caller is offered the choice to continue the conversation on the mobile application 204 through dynamic diversion. The caller is sent the SMS message with a link to the business' mobile application 204, opens the link which launches the mobile application 204, selects the seat, and then can continue on the mobile application 204 to complete the booking. Additionally or alternatively, the mobile application 204 can allow the caller to then connect with the IVR 112, the contact center agent, etc. In another example, the voice and data can be implemented as part of other protocols, e.g., using Zimmerman real time transfer protocol (ZRTP) or other protocol. ZRTP, which uses two distinct channels for voice and data, can be implemented with the contact center leveraging the IVR 112.

Figure 4:
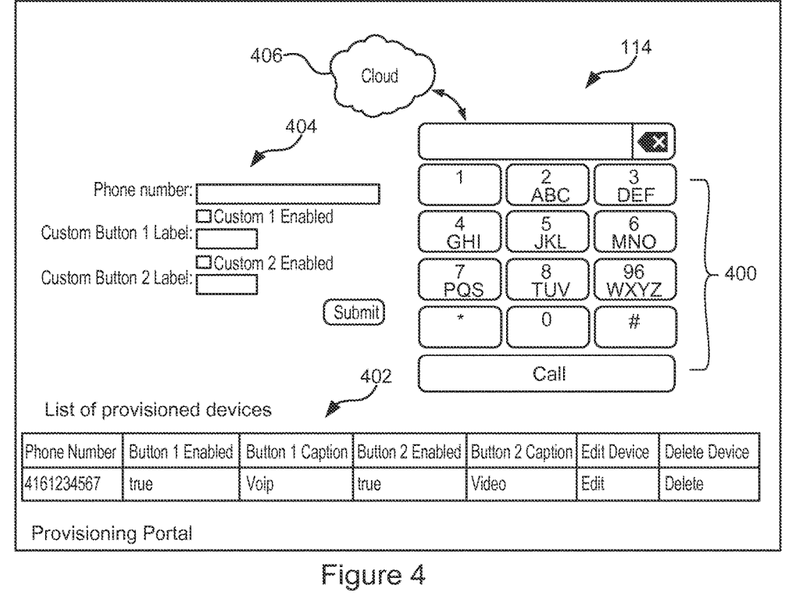
FIG. 4 is a screenshot of an example dialer.

FIG. 4 is a screenshot of an example dialer 114. The dialer 114 can be implemented as an application of the mobile device 105. The dialer 114 can include a native dialer that takes control of incoming and outgoing PSTN calls. The dialer 114 includes an interface 400 with buttons which can include numbers, letters, symbols, words, etc. for the mobile device 105 to dial, initiate and end a call, input information, etc. The dialer 114 determines the way the call is made, how a contact is located, what dialing plan is used, etc. In one example, the dialer 114 can ensure that the mobile application discussed above is installed on the mobile device 105 and be used to activate the mobile application. The dialer 114 can report to the IVR 112 that the mobile application is installed and activated so that the IVR 112 need not query the caller regarding whether or not the caller is using a mobile device 105, whether the mobile application is installed, whether the mobile application is activated, etc.

As described in more detail below, the dialer 114 is configured so that it can be modified without a need for the firmware of the phone to be rebuilt and updated on deployed mobile devices 105. The interface 400 can be updated, personalized, work with other applications on the mobile device 105, and need not be controlled by the manufacturer. The dialer 114 application can come preinstalled on the mobile device 105 so that it is not removed accidently from the mobile device 105.

The dialer 114 includes access to native features of the mobile device 105 and allows to manage both incoming and outgoing calls. The dialer 114 is customizable without the need to push a manually installed update packages to the mobile device 105. Additionally or alternatively, an existing dialer can be replaced with the dialer 114 to provide advantages of the native preinstalled application and instant delivery of new calling features for all or a selected subset of mobile device 105. Telecommunication service providers can have a flexible platform, e.g., mobile network 102, to deliver innovative and cost effective communication mechanisms between the mobile devices 105. At the same time, the mobile devices 105 can gain access to a wide range of innovative calling features integrated with the mobile device 105 and instantly available when needed.

An appearance of the interface 400 can be customized/ changed based on information from the cloud 406 instead of being set when the mobile device 105 is built. In one implementation, the interface 400 is downloaded from the cloud 406 each time the mobile device 105 is accessed. In other examples, the interface 400 is downloaded periodically. If the version of the interface 400 is updated or changed in the cloud 406, the mobile device 105 obtains a new version whenever the dialer 114 is accessed, e.g., to make a call. In other example, the interface 400 is downloaded from a local and/or remote database other than the cloud 406. The mobile network 102 of the service provider can provide a terminal capability to the dialer 114 that allows to receive the most updated functionality and look and feel from a centralized telecommunication server service provider. The terminal capability can be implemented using a browser in the application that renders HTML5 pages provided by the web server infrastructure to the mobile device 105.

The dialer 114 can operate with a telecommunication provisioning system that provides access to both service provider administrators and end callers. Service provider administrators can manage a list 402 of available features/products and the interface 400 of the mobile devices 105 can be used to select/purchase/enable the list of features, e.g., using check boxes and field inputs, etc. 404, if the mobile device user is interested in the features. The list can include a phone number of the mobile device 105, e.g., for identifying the mobile device 105. Available features/products can include button enabling, voice-over-internet protocol (Voip), video, device editing, device deleting, etc. Service providers, e.g., AT&T, Verizon can work with the mobile device manufactures to build a custom firmware for mobile devices they distribute. The dialer 114 can provide less frequent updates to the firmware of the mobile device 105. This can relieve a burden to device manufactures that are more interested in increased device sales as opposed to firmware customizations which are not core of the business. Alternatively, the dialer 114 can provide an increased value to the mobile device 105 and, therefore, may increase the sales of mobile devices.

Figure 5:
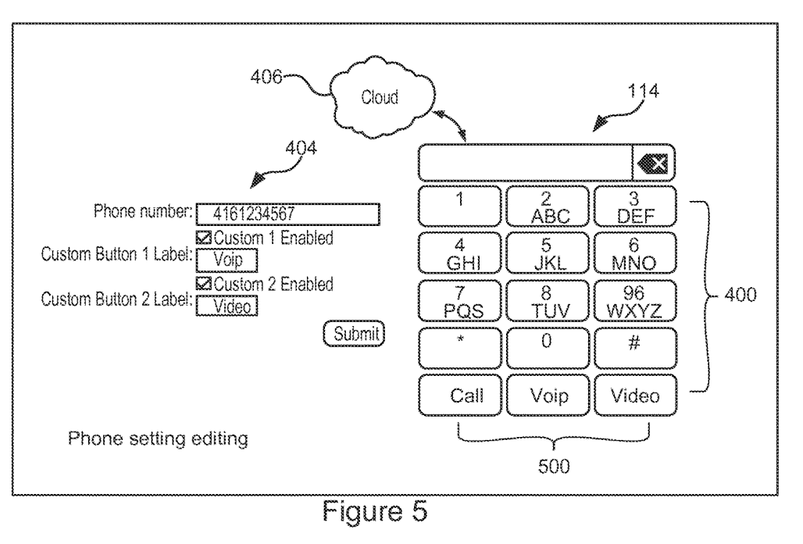
FIG. 5 is another screenshot of the example dialer.

FIG. 5 is another screenshot of the example dialer 114. The interface 400 can include customizable buttons 500, e.g., to add "VoIP" and "VIDEO" to "CALL", etc. Other buttons can include "CHAT", "WEB RTC", etc. Buttons 500 can be set from the provisioning portal inputs 404, via the mobile device 105 or a computer, and attached to a custom functionality. Additionally or alternatively, the mobile device 105 can automatically display the buttons 500 through dynamic rendering based on the type of call, e.g., when the placed connection is capable of communicating via a determined function, e.g., "VoIP", "VIDEO", etc. The cloud 406 can determine which buttons 500 to dynamically render and when to render them, for example, based on the call information, including a dialed number, etc. For example, pressing "VoIP" button makes a call over SIP network with the same number as opposed to PSTN when "Call" is pressed, thereby allowing for voice and data to communicated over the same channel. Pressing a "VIDEO" button can make a video call to the other subscriber number as opposed to a regular PSTN call. Moreover, the user can select which functionality is enabled or hidden. As the user presses the submit button on the web portal the changes are instantly applied to the dialer 114 on the mobile device 105.

The dialer 114 can include web browser control in addition to or instead of native user interface elements. As the dialer 114 starts, the dialer 114 can check what the interface 400 should look like by loading a dial pad from the central web server. Different caching techniques can be used to provide responsiveness and fast loading times and to guarantee interface 400 availability in a case of the network communication problems. Since the interface 400 is synchronized with the telecommunication server, instant delivery can be accomplished to the mobile device 105.

Additionally or alternatively, the contact center can load a mobile application to the mobile device 105 when a call is made. For example, if the customer dials 1-800-CALL-BANK, the contact center server 103 can use the dialer to load a mobile application to the mobile device 105 for the bank based on the dialed number. The mobile device 105 can then connect to the bank, or other business 104 or contact center, via the mobile application. The IVR 112, mobile application or both can authenticate an identity of the user of the mobile device 105. The mobile device 105 can be accompanied by another device that has installed an application for the contact center. For example, the other device may include a laptop with a GOOGLE CHROME extension and/or the mobile application loaded on an APPLE iPad. If a customer is on a call with a contact center, when the user opens the GOOGLE Chrome Extension or the mobile application on the iPad, the contact center application identifies that there is a session in progress and starts assisting the voice session with visual feedback allowing multimodal communication. For example, if the agent starts speaking about a new sales package, a web page with a description is displayed in the mobile application or via the GOOGLE Chrome Extension. If the IVR 112 selection is presented to the user on the call, a selection is shown in the mobile application and user's input is reflected in the IVR session. The voice and mobile application sessions can operate separately or simultaneously, e.g., to provide a voice and visual interface with the user. If there is a long wait time for the user to speak with an agent dialer 114 can seamlessly transfer the mobile device 114 to the mobile application, transferring over authentication and/or context information.

Images can provide a closer look on the provisioning portal that allows users to preview in real-time how the dialer 114 appears on the phone once a request to update is submitted. Different skins can be implemented and other different user experience can be supported. For example, the dialer 114 can provide a picture list of friends from a social media website, e.g., Facebook. The user can look for his friend's photo on the dialer 114 and tap on the picture to communicate. The look and feel can be instantly sent to the mobile device 105 allowing the end caller to have a phone that is capable of contacting his Facebook friends. Other customizations can be implemented as well. In one implementation, the dialer 114 provides a native application built-in into the mobile device's firmware distributed by the service provider. The interface 400 of the dialer 114 can be customized and personalized based on user preferences, service provider preferences, location, time of day, etc. The dialer 114 can provide cost effective, efficient and rich features. The dialer 114 can all service providers to control and charge callers for the ability to innovate within traditional native dialer user interfaces.

Figure 6:
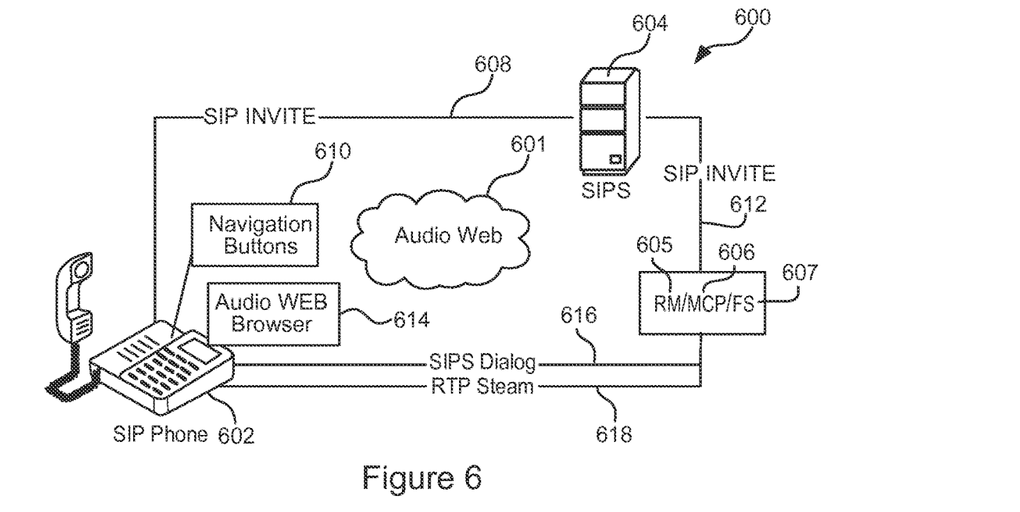
FIG. 6 is a block diagram of an example architecture for providing audio, e.g., voice, to interface and navigate the web.

FIG. 6 is a block diagram of an example architecture 600 for providing an audio web 601, e.g., using voice, to interface with and navigate websites. The architecture 600 includes a session initiation protocol (SIP) phone 602. In some implementations, the SIP phone 602 can be used to interact with the contact center as described above, or in other ways. The contact center can include a SIP server 604 that connects with a resource manager 605/media controller point 606/feature server 607 (RM/MCP/FS). The FS 607 can include the contact center server 103 for the business 104. The SIP phone 602 can interact with the SIP server 604 directly via a SIP invite 608, e.g., using the navigation buttons 610, and/or via a SIP invite 612 from the RM/MCP/FS 605, 606 607. The SIP phone 602 can use an audio web browser 614 to send a SIP dialog 616 and real-time transport protocol (RTP) signal 618 to the RM/MCP/FS 605, 606 607, which can interpret the SIP dialog 616 and real-time transport protocol (RTP) signal 618 to send the SIP invite 612 to the SIP server 604.

The SIP phone 602 can open a session through the SIP server 604. Audio commands can be locally converted into text which is sent via the SIP dialog 616. Audio contents is played via an RTP stream 618. Using audio in addition to or instead of touch, the SIP phone 602 can be used hands free to communicate while driving a car, to navigate through audio commands to search a voice mail archive, to navigate a menu, to navigate a web through graphical user interface (GUI) means, to use audio instead of the GUI means, to interact with audio content through audio commands, e.g., an audio user interface (AUI), etc. The audio web 601 can provide AUI to various audio content scenarios, e.g., a voice mail archive, an IVR 112, a music archive, radio stations, etc. Audio content can be hierarchically structured, similar to file system. AUI commands can include navigation up, down, forward, backward, top, root, begin, end, etc. The audio web 601 can provide an audio pointer to query position, select a function, etc. The audio web 601 can be used for acoustics, e.g., loudness, stereo, sound, voice quality, noise cancellation, etc.

Figure 7:
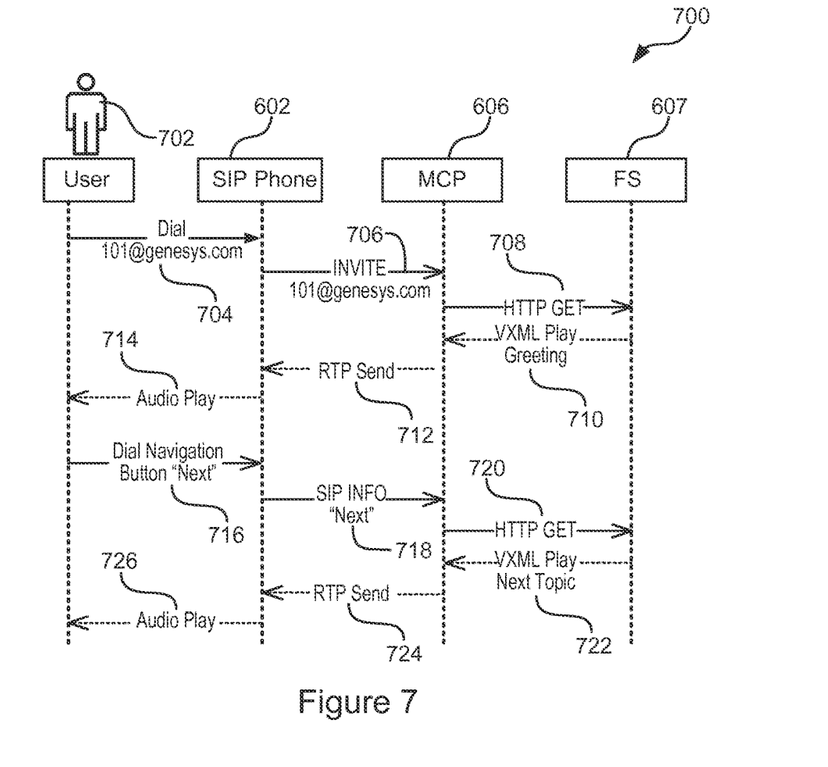
FIG. 7 is a flow diagram of an example of the SIP phone interacting through audio web.

FIG. 7 is a flow diagram 700 of an example of the SIP phone 602 interacting through audio web 601. The user 702 can dial the business 104, e.g., by dialing 101 (aeries-vs.com (704). The SIP phone 602 sends a SIP invite 101 gpesys.com to the MCP 606 (706). The MCP 606 performs a hyper text transfer protocol (HTTP) GET, or other Internet related protocol, to the FS 607 (708). The FS 607 sends a voice extensible markup language (VXML) play greeting to the MCP 606 (710). The MCP 606 performs an RTP Send to the SIP phone 602 (712), which can play a related audio to the user 702 (714). The user 702 can also use the SIP phone 602 to dial a navigation button 610, e.g., the Next button (716). The user can also audibly state Next in addition to or instead of dialing the number. The SIP phone 602 sends the SIP INFO NEXT to the MCP 606 (718), which can perform an HTTP GET (720) or other protocol command to obtain the VXML Play Next Topic from the FS 607 (722), e.g., based on the Next navigation button 610 being touched or Next being spoken. The MCP 606 uses an RTP Send to send the corresponding audio message to the SIP phone 602 (724), which can play the corresponding audio message to the user 702 (726).

The contact center and accompanying systems may be deployed in equipment dedicated to the business 104 or third-party service provider, and/or deployed in a remote computing environment such as, for example, a private or public cloud environment with infrastructure for supporting multiple contact centers for multiple businesses 104. The various components of the contact center system may also be distributed across various geographic locations and computing environments and not necessarily contained in a single location, computing environment, or even computing device.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A method, comprising:
    detecting, by a processor, an interaction from a mobile device associated with a customer;
    routing the interaction to an interactive voice response application;
    collecting, by the processor, during the interaction, context information and authentication information from the mobile device to authenticate the customer;
    detecting, by the processor, a criteria for invoking a mobile application, the mobile application being configured to be invoked in at least one of a first state and a second state;
    selecting, by the processor, a specific state from the first and second states based on the context information;
    sending, by the processor, a link to connect the mobile device to the mobile application, wherein the link is for invoking the mobile application in the selected specific state, wherein the selected specific state is for maintaining context of progress made by the customer during the interaction with the interaction voice response application;
    detecting, by the processor, selection of the link;
    authenticating the customer of the mobile device for the mobile application based on the collected authentication information without prompting the customer for the authentication information; and
    transmitting instructions for resuming the interaction with the customer via the mobile application based on the context information, wherein the mobile application is invoked in the selected specific state.

2. The method of claim 1, where the link is sent by a text message.

3. The method of claim 1, where the link includes the authentication information.

4. The method of claim 1, further comprising passing along a context of the interaction to the mobile application.

5. The method of claim 1, further comprising collecting the authentication information using a session initiation protocol dialog and a real-time transfer protocol stream.

6. The method of claim 1, further comprising dynamically rendering a button on the mobile device based on a type of interaction.

7. The method of claim 6, further comprising storing an appearance of the button in cloud memory separate from the mobile device.

8. The method of claim 1, further comprising sending the mobile device the mobile application to download based on an identification number associated with the interaction.

9. The method of claim 8, where the mobile application connects the mobile device with an enterprise server.

10. The method of claim 1, where the mobile device comprises a session initiation protocol phone.

11. The method of claim 10, further comprising navigating the mobile application using audio over a web channel.

12. The method of claim 1, wherein the first and second state are different pages in the mobile application.

13. A system comprising:
    processor; and
    memory, wherein the memory includes instructions that, when executed by the processor, cause the processor to:
        detect an interaction from a mobile device associated with a customer;
        route the interaction to an interactive voice response application;
        collect, during the interaction, context information and authentication information from the mobile device to authenticate the customer;
        detect a criteria for invoking a mobile application, the mobile application being configured to be invoked in at least one of a first state and a second state;
        select a specific state from the first and second states based on the context information;
        send a link to connect the mobile device to the mobile application, wherein the link is for invoking the mobile application in the selected specific state, wherein the selected specific state is for maintaining context of progress made by the customer during the interaction with the interaction voice response application;
        detect selection of the link;

authenticate the customer of the mobile device for the mobile application based on the collected authentication information without prompting the customer for the authentication information; and transmit instructions for resuming the interaction with the customer via the mobile application based on the context information, wherein the mobile application is invoked in the selected specific state.

14. The system of claim 13, wherein the first and second state are different pages in the mobile application.

* * * * *